April 9, 1957   E. A. KRAEMER ET AL   2,787,805
FLAME GUARD FOR PLASTIC HANDLE
Filed June 9, 1955

INVENTOR.
ELMORE A. KRAEMER
ARTHUR J. SCHMITT
BY
John W. Michael
ATTORNEY

United States Patent Office 2,787,805
Patented Apr. 9, 1957

2,787,805

FLAME GUARD FOR PLASTIC HANDLE

Elmore A. Kraemer and Arthur J. Schmitt, West Bend, Wis., assignors to West Bend Aluminum Co., West Bend, Wis., a corporation of Wisconsin Application June 9, 1955, Serial No. 514,248

2 Claims. (Cl. 16—116)

This invention relates to flame guards for utensil handles.

In some handle assemblies there is no metal socket into which a tenon on the handle is fitted. Instead, the handle extends to the side of the utensil. Because of the heat adjacent the wall of the utensil during service, the handle may easily be charred at its inner end.

It is the object of this invention therefore to provide a flame guard for those types of handles.

This is accomplished by a metal shield which is secured to the bottom of the handle at its utensil end. This shield or flame guard may be held in place by locking flanges thereon which engage grooves in the sides of the handle.

The details of an embodiment of this invention can be understood from the following specification and the drawing, in which.

Figure 1:
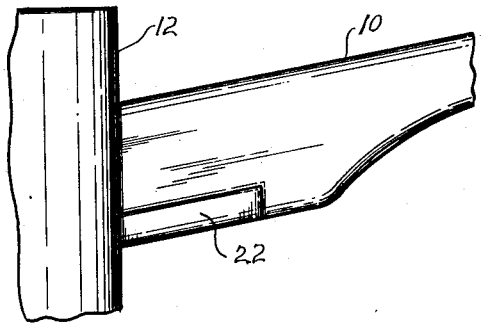
Fig. 1 is a fragmentary view in side elevation of a flame guard embodying the present invention.
Figure 2:
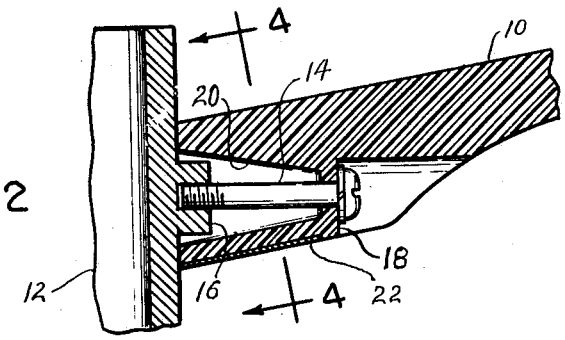
Fig. 2 is a central longitudinal vertical section of Fig. 1.
Figure 3:
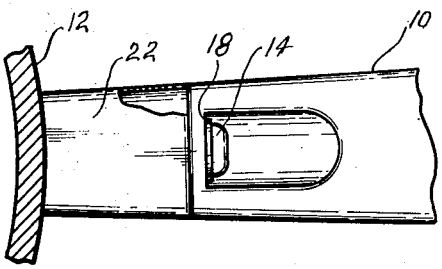
Fig. 3 is a bottom plan view of Fig. 1, part being broken away and shown in section for clarity and illustration.
Figure 4:
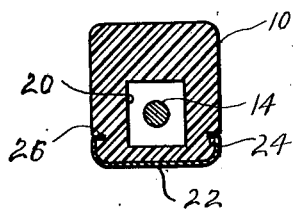
Fig. 4 is a sectional view taken on the line 4—4 of Fig. 2.

The invention shown in the drawing is incorporated in the handle assembly for cooking utensils such as saucepans or skillets. A plastic or non-metallic handle 10 has its inner or utensil end seated against the wall of a utensil 12 and firmly held thereagainst by anchoring bolt 14 threaded into a lug 16 attached to the utensil. The head of the bolt 14 rests against a shoulder 18 formed in a recess in the bottom of the handle 10. The end of the handle may be recessed at 20 to accommodate the lug 16.

With this construction the end of the non-metallic handle 10 is in direct contact with the said wall of the utensil 12. The bottom of the handle next to such side wall will be subject to considerable heat and is often apt to char and become unsightly. This is prevented by a metal flame guard 22. The inner end of the handle 10 may have a reduced section to provide a seat into which the flame guard 22 is inset. Such guard has sides which are formed around the lower corners of such reduced section. These sides terminate in inwardly directed flanges 24 which seat in grooves 26 formed in the sides of the handle 10. The guard 22 is slid onto the end of the handle 10 before the handle is assembled to the utensil 12. The outer end of the guard abuts the end of the reduced section and the wall of the utensil rests against the inner end of the flame guard and holds it in place.

In the embodiment disclosed the walls of the handle have a slight taper. In such case the walls and flanges 24 of the guard 22 are tapered to correspond. Such is not essential for holding the guard in place. There is sufficient frictional engagement between the flanges 24 and the grooves 26 to hold the guard in place. The flame guard 22 may be made of stainless steel which is polished. This has the advantage of providing ornamentation as well as the practical aspects of preventing charring. The height of the sides of the flame guard 22 is not essential. The grooves 26 should be placed far enough from the bottom of the handle to leave sufficient plastic below the grooves for proper strength.

We claim:

1. A handle assembly for cooking utensils comprising a handle member having a terminal portion provided with an inner end face adapted to be seated against the outer wall of a cooking utensil to which it may be attached, said terminal portion of the handle member being provided with a pair of upwardly facing shoulders extending longitudinally of said terminal portion for an appreciable distance from said inner end face outwardly thereof, said shoulders being disposed on opposite sides of a median plane passing vertically through the longitudinal centerline of said terminal portion, and a flame guard carried by said handle member in overlying relation to the lower exterior surfaces of the terminal portion of the handle member adjacent to the point of attachment thereof to a cooking utensil, said flame guard comprising a plate member having inwardly directed longitudinally extending flanges supportingly engaged with said shoulders.

2. The handle assembly recited in claim 1 wherein said shoulders each form one wall of a groove in which the respective flanges of the flame guard are seated and wherein the flame guard is contoured to conform substantially to a lower exterior surface of the handle member between said grooves.

References Cited in the file of this patent

UNITED STATES PATENTS

| | | |
|---|---|---|
| 1,492,251 | Kolp | Apr. 29, 1924 |
| 1,739,700 | Wilson | Dec. 17, 1929 |
| 2,172,524 | Stevens | Sept. 12, 1939 |
| 2,522,579 | Le Rette | Sept. 19, 1950 |
| 2,595,361 | Keating | May 6, 1952 |